Nov. 12, 1929.　　　　　E. L. DENNIS　　　　　1,735,237
GARDEN TOOL
Filed March 19, 1928
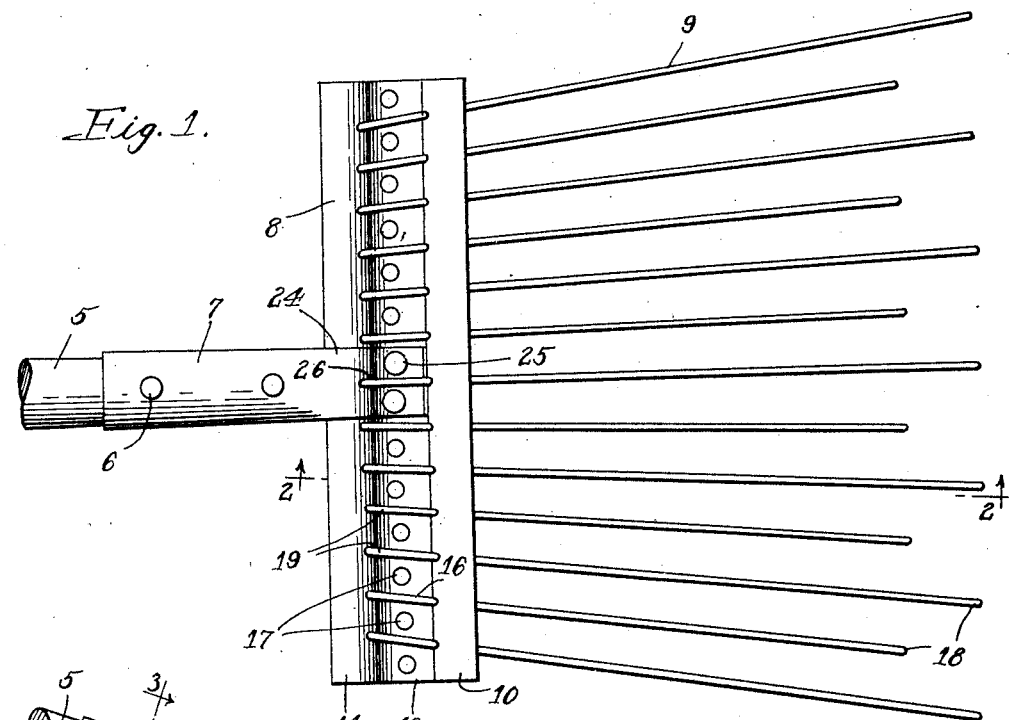
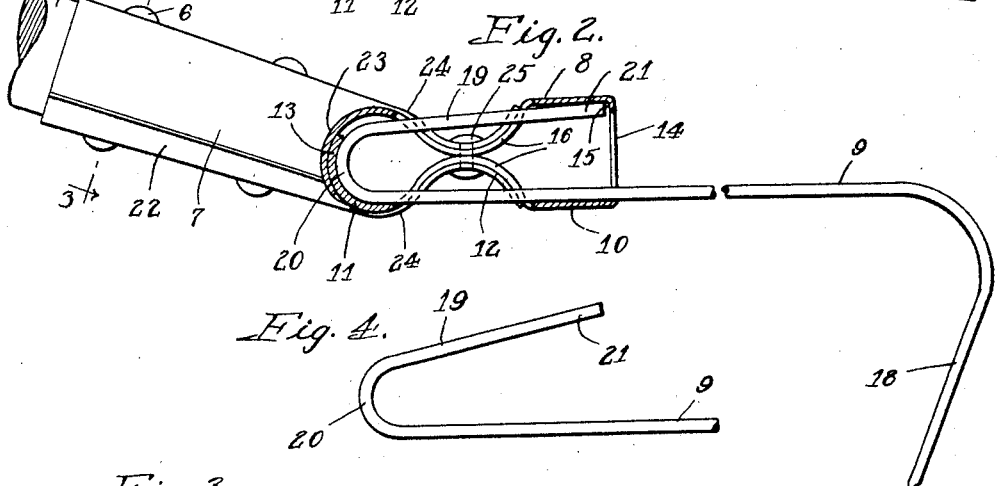
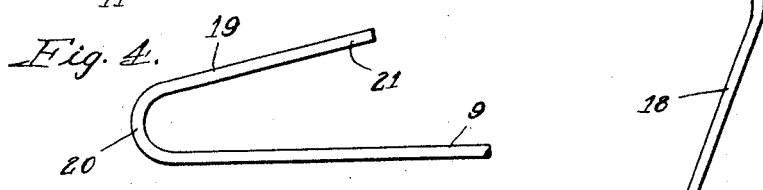
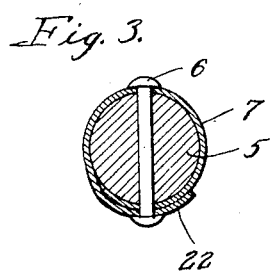
Inventor:
Elmer L. Dennis
By Wilson & McCanna
Attys.

Patented Nov. 12, 1929

1,735,237

UNITED STATES PATENT OFFICE

ELMER L. DENNIS, OF ROCKFORD, ILLINOIS, ASSIGNOR TO THE WASHBURN COMPANY, OF WORCESTER, MASSACHUSETTS, A CORPORATION OF MASSACHUSETTS

GARDEN TOOL

Application filed March 19, 1928. Serial No. 262,615.

This invention relates to garden tools generally, but has particular reference to rakes, soil pulverizers, and weeders for use on lawns, in gardens, and about shrubbery and flowers, the principal feature of said tools being the spring teeth which are quickly removable and replaceable either for the replacement of broken or bent teeth or the substitution of teeth of a different kind for a different kind of work.

The principal object of my invention is to provide a tool of the character referred to of an extremely light and durable, as well as economical construction, and one which, while it permits of the fairly easy removal and replacement of teeth, is arranged to hold the same securely locked in place against accidental removal.

The invention is illustrated in the accompanying drawing in which—

Figure 1 is a plan view of a garden rake embodying my invention;

Fig. 2 is a section on a slightly enlarged scale taken on the line 2—2 of Fig. 1, the teeth being broken away intermediate the ends thereof;

Fig. 3 is a section taken on the line 3—3 of Fig. 2; and

Fig. 4 is an isolated view of the hook-shaped fastening end of one of the removable spring wire teeth.

The same reference numerals are applied to corresponding parts throughout the views.

The invention, as stated above, is shown applied to a garden rake having a handle 5 of suitable length fastened, as by means of bolts or rivets 6, in a socket 7 extending rearwardly from the middle of a head 8 and at right angles thereto, the head being of sufficient length to carry a suitable number of teeth 9 for the purpose contemplated. It should, however, be evident that the features incorporated in the tool shown might be employed in a tool of different proportions intended for a different purpose. Thus, for example, as stated above, a small tool, such as a weeder, embodying the present improvements may be made for close-up hand work, or the tool herein shown may be changed from a garden rake to a lawn cleaner by simply substituting the proper size and form of teeth.

According to my invention both the socket 7 and head 8 are suitably formed of sheet metal for lightness and durability as well as cheapness. The head 8 is formed from a single piece of sheet metal bent substantially to a keyhole-shaped cross-section forming a substantially rectangular front portion 10 and a rounded back portion 11 joined by intermediate abutting web portions 12, the free longitudinal edges of the piece of sheet metal forming the head being bent into overlapping relation along the back of the head, as indicated at 13. The head may, if desired, be formed from a piece of tubing pressed between dies to the keyhole-shaped cross-section. The front wall of the rectangular portion 10 has vertical slots 14 punched therein prior, of course, to the bending of the piece of sheet metal to the form shown, the slots being in substantially equally spaced relation longitudinally of the head and extending from the bottom wall of the portion 10 to a point near the top wall, thus presenting shoulders at 15 for a purpose presently to appear. The web portions 12 are slotted, as shown at 16, in line and also in the same plane with the slots 14, the slots 16 being suitably formed in mutually divergent relation for the purpose of disposing the teeth 9 in corresponding relation, as will presently appear and as best shown in Fig. 1. The web portions 12 are spot-welded together between the slots 16, as shown at 17, thus making the head very strong and rigid despite the fact that it may be made of comparatively light gauge sheet metal. The teeth 9 are formed of spring steel wire with downwardly curved and suitably pointed forward ends 18 of the desired length. The other ends of the teeth are bent into the form of elongated hooks 19, each of which is arranged to be entered through a slot 14 to bring the bight portion 20 into the rounded back portion 11 of the head and the intermediate portion of the hook 19 into the slots 16, the free end 21 of the hook being arranged to ride through the slot 14 to come into position behind the shoulder 15 whereby to lock the tooth in place. The hooks 19 of the teeth are normally opened to the form shown in Fig. 4 and in the entering thereof through the slots 14 are somewhat compressed, as will be evident from observation of Fig. 2 so that the free ends 21 are held in locked position under appreciable pressure. To remove a tooth it is simply necessary to compress its hook-shaped fastening end 19 sufficiently to permit withdrawal through the slot 14. Enough of each hook is exposed at the slots 16 to permit compression of the hooks by hand in the case of teeth formed of light spring wire, or by means of suitable tools, in the case of heavier teeth. In any event, the teeth are held in place securely enough to avoid the likelihood of accidental removal. It will be evident that each tooth is held in its proper plane by the engagement of its hooks in the slots 16.

The socket 7 is preferably formed of a single piece of sheet metal bent into a sleeve form with the edges overlapped, as shown at 22, sufficiently to permit the passing therethrough of the rivets or bolts 6 which fasten the handle 5 to the socket. The forward end of the socket is cut away on opposite sides, as shown at 23, to fit neatly over the back of the head 8 and provides upper and lower lugs 24 bent to fit in the hollows of the web portions 12, as best appears in Fig. 2. Rivets or bolts 25 are provided for securing the socket 7 to the head 8, although, of course the same might be spot-welded similarly as at the points 17. The lugs 24 are also slotted, as appears at 26, for the reception of the hooked end of the middle tooth of the rake. It will be evident that the construction, while very light, is quite strong and rigid and is fairly inexpensive.

It is believed the foregoing description conveys a clear understanding of my invention and of its various objects and advantages. The appended claims have been drawn with a view to covering all legitimate modifications and variations of the invention which may occur to those skilled in the art to which the invention relates.

I claim:

1. A device of the character described comprising an elongated hollow head member of substantially keyhole-shaped cross-section, and a plurality of spring wire teeth arranged to extend from the head and be detachably mounted therein, said teeth having the fastening ends thereof bent in the form of hooks, said head having the front wall thereof provided with substantially vertical slots spaced longitudinally of the head to permit the entry of the bight portions of the hooks into the head, the curved bight portions being disposed vertically and fitting in the curved back wall of said head and the head being further slotted intermediate the front and back walls thereof in the planes of the vertical slots for the reception of portions of the hooks intermediate the bight portions and the free ends of the hooks.

2. A device as set forth in claim 1 wherein the first mentioned vertical slots in the front wall terminate short of the adjoining rearwardly extending wall so as to provide shoulders between the ends of the slots and the last mentioned wall, and wherein the hooked ends of said teeth are arranged to be inserted in the head until the free ends of the hooks pass through the slots and are arranged to lie behind said shoulders so as to lock the teeth in place in the head.

3. A device as set forth in claim 1 wherein the walls of said head member comprising said intermediate portions are fastened together at points spaced longitudinally of said head member between the last mentioned slots for the purposes described.

4. A device of the character described comprising an elongated tubular head member, and a plurality of spring wire teeth extending from one side of said head spaced longitudinally of the head and arranged to be detachably mounted in said head, each of said teeth having the fastening end thereof formed into an elongated hook, said head being broad enough internally to receive the elongated hooked ends of said teeth, the front wall of said head being slotted vertically for the passage of the bight portions of the hooks therethrough into the head, the slots terminating short of an adjoining wall whereby to provide shoulders between the ends of the slots and the adjoining wall, the hooked ends of said teeth being inserted into the head far enough to permit the engagement of the free ends of the hooks behind said shoulder inside said head, and means in said head for preventing the turning of the hooked ends of said teeth out of the plane of the aforesaid slots.

5. A device as set forth in claim 4 wherein the last mentioned means comprises portions of the walls of said tubular head member bent inwardly for engagement with the sides of the hooked ends of said teeth.

6. A device as set forth in claim 4 wherein the last mentioned means comprises an inwardly bent portion of the wall of said tubular head member extending longitudinally of the latter and having slots provided therein in the plane of the other slots for the reception of a portion of the hooked ends of said teeth between the bight portions and the free ends of said hooks, the said hooked ends of said teeth being accessible from outside of the head by reason of said slots so as to facilitate removal of said teeth as herein described.

7. A device as set forth in claim 4 wherein the last mentioned means comprises inwardly bent portions of the top and bottom walls of said tubular head member extending longitudinally of the latter, said portions having slots therein in the planes of the other slots arranged to receive the hooked ends of the teeth between the bight portions and the free ends of said hooks, the portions of the hooked ends of said teeth received in said slots being exposed outside the head by reason of the slots whereby to facilitate removal of said teeth when desired.

8. A device as set forth in claim 4 wherein the last mentioned means comprises inwardly bent portions of the top and bottom walls of said tubular head member extending longitudinally of the latter, said portions being disposed in abutting relation and fastened together at longitudinally spaced points, and said portions also having slots therein intermediate said points in the planes of the other slots arranged to receive the hooked ends of the teeth between the bight portions and the free ends of said hooks, the portions of the hooked ends of said teeth received in said slots being exposed outside the head by reason of the slots whereby to facilitate removal of said teeth when desired.

9. A device of the character described comprising an elongated tubular head member, and a plurality of spring wire teeth extending from one side of said head spaced longitudinally of the head and arranged to be detachably mounted in said head, each of said teeth having the fastening end thereof formed into an elongated hook, said head being substantially keyhole-shaped in cross-section and having the bight portions of the hooks disposed vertically and fitting in the rounded back portion thereof, the substantially rectangular front portion of the head having the front wall provided with vertical slots for the passage of the bight portions of the hooks therethrough into the head, that portion of the head intermediate the front and back thereof having slots provided therein in the planes of the aforesaid slots for the reception of enough of each of the hooks to prevent the turning thereof out of the planes of the aforesaid slots, and means whereby the hooked ends of said teeth are normally held against withdrawal from said head through the aforesaid slots.

In witness of the foregoing I affix my signature.

ELMER L. DENNIS.